US008553933B2

(12) United States Patent
Newman et al.

(10) Patent No.: US 8,553,933 B2
(45) Date of Patent: Oct. 8, 2013

(54) EDGE DIVERSITY OBJECT DETECTION

(75) Inventors: Arthur M. Newman, Sherman Oaks, CA (US); Brandon Crow, Playa del Rey, CA (US)

(73) Assignee: Raytheon Company, Waltham, MA (US)

( * ) Notice: Subject to any disclaimer, the term of this patent is extended or adjusted under 35 U.S.C. 154(b) by 464 days.

(21) Appl. No.: 12/943,337

(22) Filed: Nov. 10, 2010

(65) Prior Publication Data
US 2012/0114171 A1 May 10, 2012

(51) Int. Cl.
*G06K 9/00* (2006.01)
(52) U.S. Cl.
USPC ............ 382/103; 282/170; 282/171; 282/199
(58) Field of Classification Search
None
See application file for complete search history.

(56) References Cited

U.S. PATENT DOCUMENTS

| 4,685,143 | A | * | 8/1987 | Choate | 382/170 |
|---|---|---|---|---|---|
| 5,341,142 | A | | 8/1994 | Reis et al. | |
| 5,668,888 | A | * | 9/1997 | Doi et al. | 382/132 |
| 5,694,487 | A | | 12/1997 | Lee | |
| 5,867,592 | A | | 2/1999 | Sasada et al. | |
| 6,072,889 | A | | 6/2000 | Deaett et al. | |
| 6,665,439 | B1 | * | 12/2003 | Takahashi | 382/199 |
| 6,912,309 | B2 | | 6/2005 | Lee | |
| 7,062,099 | B2 | | 6/2006 | Li et al. | |
| 7,386,186 | B2 | | 6/2008 | Ovsiannikov | |
| 7,430,303 | B2 | * | 9/2008 | Sefcik et al. | 382/103 |
| 7,773,787 | B2 | | 8/2010 | Tek et al. | |
| 8,224,110 | B2 | * | 7/2012 | Mishima et al. | 382/264 |
| 2012/0121190 | A1 | * | 5/2012 | Newman et al. | 382/199 |
| 2012/0281872 | A1 | * | 11/2012 | Zitnick, III | 382/103 |

OTHER PUBLICATIONS

Qiiang Gao, "Extracting Object Silhouettes by Perceptual Edge Grouping," 1997, IEEE International Conference on Systems, Man, and Cybernetics, pp. 2450-2454.
Joachim S. Stahl et al., "Edge Grouping Combining Boundary and Region Information," Oct. 2007, IEEE Transactions on Image Processing, vol. 16, No. 10, pp. 2590-2606.

* cited by examiner

*Primary Examiner* — Barry Drennan
(74) *Attorney, Agent, or Firm* — Pierce Atwood LLP; Joseph M. Maraia (57) ABSTRACT

Methods for detecting objects in an image. The method includes a) receiving magnitude and orientation values for each pixel in an image and b) assigning each pixel to one of a predetermined number of orientation bins based on the orientation value of each pixel. The method also includes c) determining, for a first pixel, a maximum of all the pixel magnitude values for each orientation bin in a predetermined region surrounding the first pixel. The method also includes d) summing the maximum pixel magnitude values for each of the orientation bins in the predetermined region surrounding the first pixel, e) assigning the sum to the first pixel and f) repeating steps c), d) and e) for all the pixels in the image.

17 Claims, 7 Drawing Sheets

| M=0.5<br>Bin=1 | M=0.95<br>Bin=1 | M=0.8<br>Bin=1 |
|---|---|---|
| M=0.95<br>Bin=1 | M=0.8<br>Bin=1 | M=0.7<br>Bin=0 |
| M=0.8<br>Bin=1 | M=0.7<br>Bin=0 | M=0.7<br>Bin=0 |

FIG. 2D

| M=0.5<br>Bin=2 | M=0.9<br>Bin=1 | M=0.8<br>Bin=1 |
|---|---|---|
| M=0.9<br>Bin=1 | M=0.8<br>Bin=1 | M=0.7<br>Bin=0 |
| M=0.8<br>Bin=1 | M=0.7<br>Bin=0 | M=0.7<br>Bin=0 |

EDGE DIVERSITY OBJECT DETECTION

FIELD OF THE INVENTION

The currently described invention relates to systems and methods for detecting objects in an image.

BACKGROUND

Prior art methods for detecting objects of interest in images are often unable to distinguish between the object of interest and its surroundings. For example, previous attempts at detecting boats in a maritime setting often fail because image intensity levels associated with the boat are often also present in the wake and/or spray created by the boat as well as the glint created by the sun reflecting off the surface of the water. Similar problems occur when trying to detect objects in an image in the presence of other environmental effects (e.g., fog, moisture in the air, smog, smoke, exhaust plumes) present in an image. Typical edge detection methods fail because edges that form on unwanted features (i.e., surroundings) are often stronger in intensity than those formed on the object of interest in the image. A need therefore exists for improved systems and methods for detecting objects in an image.

SUMMARY

Edge detection is used to identify points in an image at which the image intensity changes sharply or exhibits discontinuities. Intensity changes and discontinuities often correspond to changes in depth, surface orientation, material properties and/or illumination. Man-made objects such as boats are characterized as having strong edges at multiple orientations. Embodiments described herein relate generally to systems and methods for detecting objects in an image in spite of unwanted features or surroundings also being present in the image.

One embodiment features a method for detecting objects in an image. The method includes a) receiving magnitude and orientation values for each pixel in an image and b) assigning each pixel to one of a predetermined number of orientation bins based on the orientation value of each pixel. The method also includes c) determining, for a first pixel, a maximum of all the pixel magnitude values for each orientation bin in a predetermined region surrounding the first pixel. The method also includes d) summing the maximum pixel magnitude values for each of the orientation bins in the predetermined region surrounding the first pixel, e) assigning the sum to the first pixel and f) repeating steps c), d) and e) for all the pixels in the image.

In some embodiments, summing the maximum pixel magnitude values for each of the orientation bins in the predetermined region surrounding the first pixel increases the magnitude value of each pixel having multiple edge orientations in the predetermined region surrounding the pixel. In some embodiments, the method includes generating an updated image of the pixels based on the sum for each pixel. In some embodiments, generating the updated image includes establishing thresholds for the pixel sums. In some embodiments, the method includes identifying a target region in the updated image nearest an operator aimpoint by performing a connected-components analysis of the updated image based on the thresholds.

In some embodiments, the method includes aggregating the image prior to step a) by a function of horizontal ground sample distance of the image. In some embodiments, aggregating the image prior to step a) includes increasing the aggregation of the image via a bivariate function of the ground sample distance of the image and solar glint angle of the image. In some embodiments, the method includes aggregating the image prior to step a) by a function of horizontal ground sample distance and solar glint angle of the image. In some embodiments, the predetermined number of orientation bins is N and angular range of each bin is $$\frac{360°}{N}.$$

One embodiment features a system for detecting objects in an image. The system includes an input module to receive magnitude and orientation values for each pixel in an image. The system also includes an image processing module to a) assign each pixel to one of a predetermined number of orientation bins based on the orientation value of each pixel, b) determine, for a first pixel, a maximum of all the pixel magnitude values for each orientation bin in a predetermined region surrounding the first pixel, c) sum the maximum pixel magnitude values for each of the orientation bins in the predetermined region surrounding the first pixel, d) assign the sum to the first pixel, and e) repeat steps c), d) and e) for all the pixels in the image.

In some embodiments, the system includes an image aggregation module to aggregate the image prior to step a) by a function of horizontal ground sample distance of the image, wherein the image aggregation module provides the aggregated image to the pixel processing module. In some embodiments, the image aggregation module is configured to increase the aggregation of the image via a bivariate function of the ground sample distance of the image and solar glint angle of the image.

In some embodiments, the system includes an image aggregation module to aggregate the image prior to step a) by a function of horizontal ground sample distance and solar glint angle of the image, wherein the image aggregation module provides the aggregated image to the pixel processing module.

One embodiment features a system for detecting objects in an image. The system includes a) means for receiving magnitude and orientation values for each pixel in an image, b) means for assigning each pixel to one of a predetermined number of orientation bins based on the orientation value of each pixel, c) means for determining, for a first pixel, a maximum of all the pixel magnitude values for each orientation bin in a predetermined region surrounding the first pixel, d) means for summing the maximum pixel magnitude values for each of the orientation bins in the predetermined region surrounding the first pixel, e) means for assigning the sum to the first pixel, and f) means for repeating steps c), d) and e) for all the pixels in the image.

One embodiment features a computer program product, tangibly embodied in an information carrier. The computer program product includes instructions being operable to cause an image processing module to a) receive magnitude and orientation values for each pixel in an image and b) assign each pixel to one of a predetermined number of orientation bins based on the orientation value of each pixel. The computer program product also includes instructions being operable to cause an image processing module to c) determine, for a first pixel, a maximum of all the pixel magnitude values for each orientation bin in a predetermined region surrounding the first pixel, d) sum the maximum pixel magnitude values for each of the orientation bins in the predetermined region surrounding the first pixel, e) assign the sum to the first pixel, and f) repeat steps c), d) and e) for all the pixels in the image.

In some embodiments, the instructions are operable to cause an image aggregation module to aggregate the image prior to step a) by a function of horizontal ground sample distance of the image, wherein the image aggregation module provides the aggregated image to the pixel processing module. In some embodiments, the instructions are operable to cause an image aggregation module to increase the aggregation of the image via a bivariate function of the ground sample distance of the image and solar glint angle of the image. In some embodiments, the instructions are operable to cause an image aggregation module to aggregate the image prior to step a) by a function of horizontal ground sample distance and solar glint angle of the image, wherein the image aggregation module provides the aggregated image to the pixel processing module.

Other aspects and advantages of the current invention will become apparent from the following detailed description, taken in conjunction with the accompanying drawings, illustrating the principles of the invention by way of example only.

BRIEF DESCRIPTION OF THE DRAWINGS

The foregoing features of various embodiments of the invention will be more readily understood by reference to the following detailed descriptions in the accompanying drawings, in which.

DETAILED DESCRIPTION OF ILLUSTRATIVE EMBODIMENTS

Figure 1:
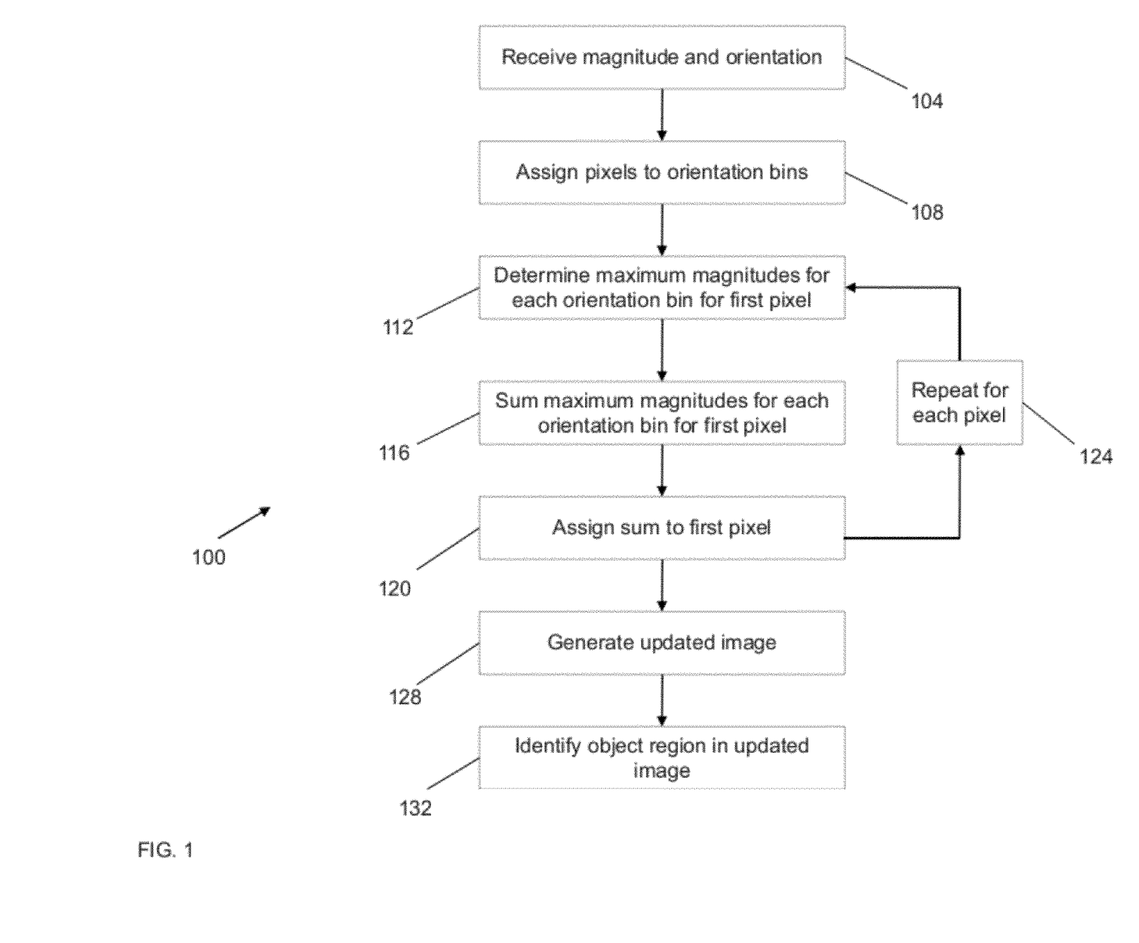
FIG. 1 is a flowchart of a method for detecting objects in an image, according to an embodiment.

FIG. 1 is a flowchart 100 of a method for detecting objects in an image, according to an embodiment. The method includes receiving (step 104) magnitude (M(x,y)) and orientation (θ(x,y)) values for each pixel in an image. The method also includes assigning (step 108) each pixel to one of a predetermined number of bins based on the orientation value of each pixel. The total angular range of the orientation bins is 360 degrees. If, for example, the processing system used to process the image is configured such that there are 20 orientation bins of equal size, each bin would span an angular range of 18 degrees.

In one embodiment, step 108 includes assigning each pixel to a bin in accordance with:

$$\theta_{NB}(x, y) = \left\lfloor \frac{NB}{2\pi} \cdot \mathrm{mod}\left(\theta(x, y) + \frac{\pi}{NB}, 2\pi\right) \right\rfloor,$$
$$\theta_{NB} \in [0, NB - 1],$$

EQN. 1 where NB is the number of bins. Those skilled in the art will recognize this is one exemplary method for assigning pixels to bins. Alternative methods for assigning each pixel to a bin can be used in alternative embodiments.

Figure 2A:
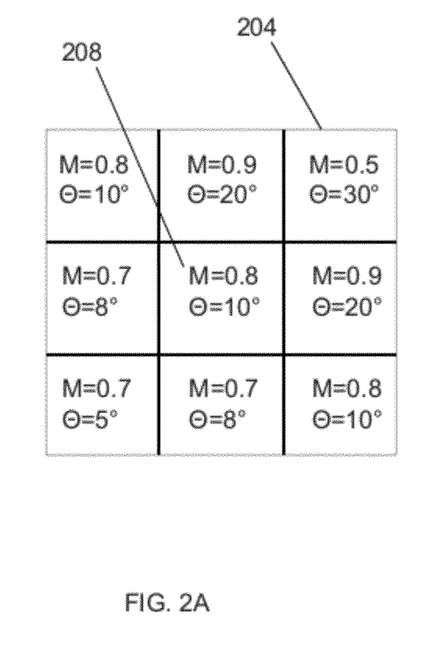
FIGS. 2A, 2B, 2C and 2D are schematic illustrations used in determining for a first pixel in an image, the maximum pixel magnitude value for each orientation bin in a predetermined region surrounding the first pixel, according to two embodiments.
Figure 2B:
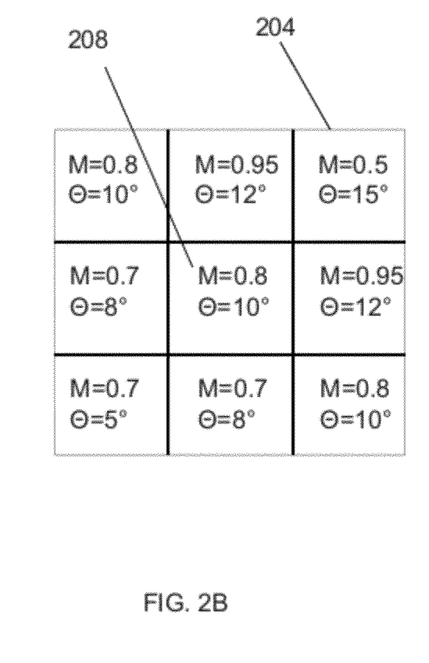
Figure 2C:
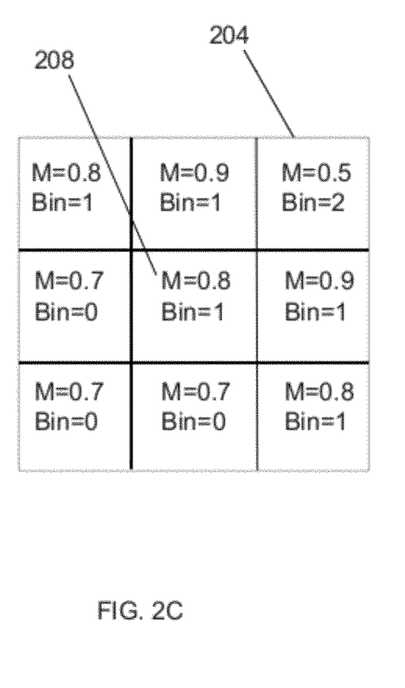
Figure 2D:
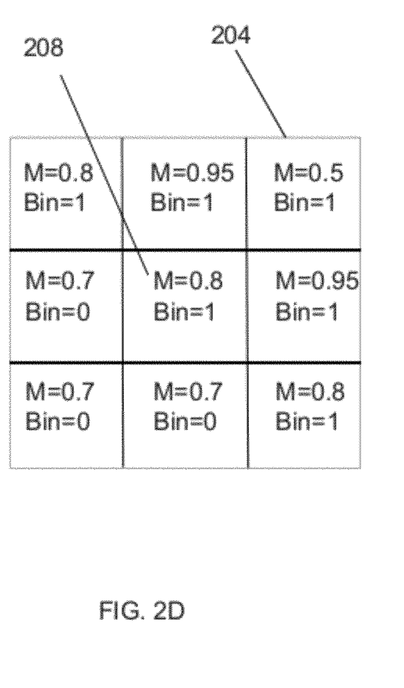

The method also includes determining (step 112) for a first pixel in the image, the maximum pixel magnitude value for each orientation bin in the predetermined region surrounding the first pixel. By way of example (referring to FIGS. 2A and 2B), in one embodiment, the predetermined region is a 3×3 kernel surrounding each pixel and each orientation bin spans an angular range of 18 degrees (i.e., 350-8, 9-26; 27-44; 45-62 . . . ). FIGS. 2A and 2B illustrate the pre-binned orientations, while FIGS. 2C and 2D illustrate the post-binning state for FIGS. 2A and 2B, respectively. FIG. 2A illustrates the magnitude (M) and orientation (Θ) for each pixel in the predetermined region 204 surrounding the first pixel 208. With respect to FIG. 2C, step 112 determines the maximum of orientation bin 0 is 0.7, the maximum of orientation bin 1 is 0.9, and the maximum of orientation bin 2 is 0.5. In contrast (with respect to FIG. 2D), step 112 determines there are two orientation bins (0 and 1). The maximum of orientation bin 0 is 0.7 and the maximum of orientation bin 1 is 0.95.

Referring to FIG. 1, the method also includes summing (step 116) the maximum pixel magnitude values for each of the orientation bins in the predetermined region surrounding the first pixel. Step 116 determines the sum equals 2.1 (sum of 0.7 for orientation bin 0, 0.9 for orientation bin 1 and 0.5 for orientation bin 2) for the example illustrated by FIG. 2C. In contrast, step 116 determines the sum equals 1.65 (0.7 for orientation bin 0 and 0.95 for orientation bin 1) for the example illustrated by FIG. 2D. Each of the orientation bins represents a different range of edge orientations in the image. Step 116 has the effect of increasing the magnitude value of each pixel that has multiple edge orientations in the predetermined region surrounding a pixel. This is beneficial in detecting objects in an image.

Intensity changes and discontinuities often correspond to changes in depth, surface orientation, material properties and/or illumination. Man-made objects such as boats or planes are characterized as having strong edges at multiple orientations. In contrast, target-generated turbulence (e.g., the wake of the boat, contrails of a plane) does not generally exhibit edges at multiple orientations. Therefore, methods described herein have the effect of emphasizing in the image those features (e.g., features of a target object) that are of interest to an operator of the system.

The method also includes assigning (step 120) the sum from step 116 as the new magnitude to be associated with the first pixel. The method also includes repeating (step 124) the steps 112, 116 and 120 for all the pixels in the image.

In one embodiment, steps 112, 116 and 120 are performed in accordance with $\forall (x,y) \in (M, \theta_{NB})$ and:

$$\sum_{b=0}^{NB-1} A[b] = 0$$

EQN. 2

$$\sum_{x=-wsz}^{x=wsz} \sum_{y=-wsz}^{wsz} A[\theta(x, y)] = \max(M(x, y), A[\theta(x, y)])$$

EQN. 3

$$UI(x, y) = \sum_{b=0}^{NB-1} A[b] \qquad \text{EQN. 4}$$

where, wsz is the size of the predetermined region surrounding each pixel (e.g., wsz=2 defines a 5×5 region used in the method to surround each pixel), A is the accumulation (summing) array, b is the bin number., and UI(x,y) is the updated image and is the sum for each of the pixels.

The method also includes generating (step 128) the updated image. In one embodiment, generating the updated image (step 128) includes establishing thresholds for the pixel sums (from step 120) using one or more methods known by those skilled in the art. For example, one exemplary method for establishing a threshold involves setting a threshold magnitude above which each pixel of the updated image is displayed with a maximum magnitude value, and below which a magnitude value of zero is displayed. In some embodiments, multiple thresholds are established based on ranges of pixel magnitude in the updated image.

In this embodiment, the method also includes identifying (step 132) a region in the updated image that is, for example, associated with an object of interest (e.g., a target object). Various known methods can be used for this purpose. In one embodiment, step 132 includes identifying a target region in the updated image nearest an operator aimpoint by performing a connected-component analysis of the updated image. The connected-component analysis identifies the region nearest the operator aimpoint having the greatest number of connected pixels above the threshold (step 128).

Figure 3:
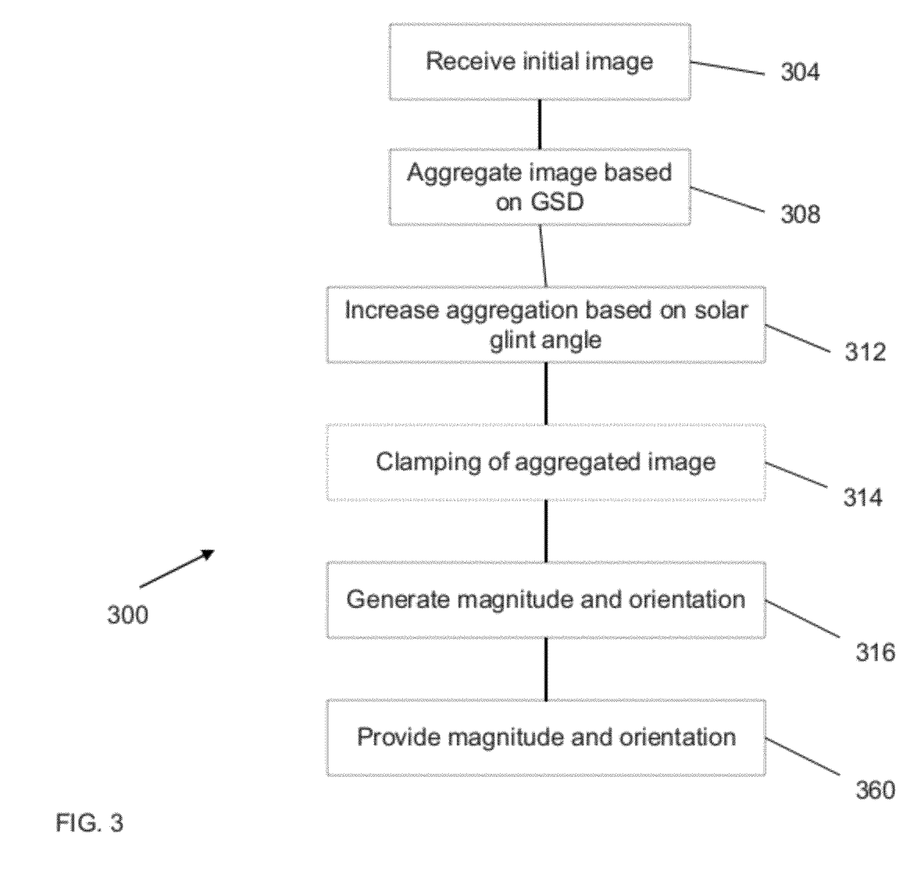
FIG. 3 is a flowchart of a method for aggregating an initial input image to generate a scaled down version of the initial input image, according to an embodiment.

FIG. 3 is a flowchart 300 of an exemplary method for aggregating an initial input image to generate a scaled down version of the initial input image. The output of the method may, for example, be provided to a method for detecting objects in an image (e.g., the method of FIG. 1). The method includes receiving (step 304) an initial image. The image can be, for example, a digital image having a plurality of pixels that defines the image.

The method also includes aggregating (step 308) the initial image based on the horizontal ground sample distance (GSD or gsd). GSD is the spacing between each pixel location in an image. GSD is a limitation to image resolution due to sampling when acquiring the initial image. For example, each pixel in an image having a one-meter GSD corresponds to a ground area of 1 square meter. Aggregating the initial image comprises downsampling the image using a kernel function on the pixels of the image.

For example, in one embodiment, aggregating includes calculating the average value of the magnitudes of each pixel located within a region of pixels, N by N pixels in size. A single pixel whose magnitude is their average value replaces the region. This is then repeated for each of the other pixel regions in the image. Alternative kernel functions can be used in alternative embodiments. For example, square or rectangular shaped kernels can be used in some embodiments. In addition, instead of calculating an average, a weighted average can be calculated.

In one embodiment, aggregating (step 308) the initial image includes aggregating the initial image based on the horizontal ground sample distance in accordance with:

$$\text{Aggregate} = P \cdot gsd^{-Q} \qquad \text{EQN. 5}$$

where P and Q are parameters determined based on the type of imaging system used to acquire the initial image. The value of Aggregate specifies the size of the kernel function used to aggregate the initial image. For example, if Aggregate=2, the image size is reduced by a factor of 2 in both the x and y dimensions. P and Q can be determined by, for example, using a test image as the initial image and evaluating various values for P and Q that produce an aggregated output image that is subjectively determined (by, for example, an operator) to be a desirable image. A desirable image is one in which objects within the image have desirable contrast and image intensity.

In instances where the value of Aggregate is not an integer, the value can be, but is not required to be, rounded to an integer value (e.g., using a floor or ceiling function). Some embodiments allow for a non-integer value to be used. For example, one skilled in the art will appreciate that interpolation functions can be used to aggregate the initial image based on a non-integer value.

The method also includes increasing the aggregation (step 312) based on solar glint angle associated with the image. This step is omitted in some embodiments, where the effect of solar glint angle is relatively small, nonexistent, or not applicable to the image scene. However, in some instances, the component of image intensity due to solar glint radiance can be significantly greater than the image intensity of objects of interest in the image. It is therefore desirable to reduce the effect of solar glint in the image processing. The solar glint angle is defined as the square root of the sum of the squares (RSS) of the difference in azimuth and elevation of the imaging sensor and the sun, in accordance with:

$$\alpha_G = (\Delta_{Az}^2 + \Delta_{El}^2)^{1/2} \qquad \text{EQN. 6}$$

where $\Delta_{AZ}$ is the difference in azimuth and $\Delta_{EL}$ is the difference in elevation.

In one embodiment, the aggregation is increased by a bivariate function of GSD and solar glint angle in accordance with:

$$\text{Aggregate} = P \cdot gsd^{-Q} + 12\exp\left(-\frac{1}{2(1-\rho^2)}\left[\frac{gsd^2}{\sigma_{gsd}^2} + \frac{\alpha_G^2}{\sigma_{\alpha G}^2} - \frac{2 \cdot \rho \cdot gsd \cdot \alpha_G}{\sigma_{gsd} \cdot \sigma_{\alpha G}}\right]\right) \qquad \text{EQN. 7}$$

where $\sigma_{gsd}$ is the deviation of the statistical distribution of GSD, $\sigma_{\alpha G}$ is the standard deviation of the statistical distribution of solar glint angle, and $\rho$ is the correlation between GSD and solar glint angle. Aggregation improves image processing and object detection by getting more target structure in the kernel, therefore more angles are also represented in the kernel. Aggregating wake or turbulence does not increase the number of angles in the kernel. Glint can have strong edges at a variety of angles, and would otherwise have a very strong, undesirable response in the processed image. Aggregation helps by reducing the size of glint patches, often to the point of eliminating them entirely from the input image.

In another embodiment, more generally, the aggregation is instead increased by a bivariate function of GSD and solar glint angle in accordance with:

$$\text{Aggregate} = P \cdot gsd^{-Q} + 12\exp\left(-\frac{1}{2(1-\rho^2)}\left[\frac{(gsd - \overline{gsd})^2}{\sigma_{gsd}^2} + \frac{(\alpha_G - \overline{\alpha_G})^2}{\sigma_{\alpha G}^2} - \frac{2 \cdot \rho \cdot (gsd - \overline{gsd}) \cdot (\alpha_G - \overline{\alpha_G})}{\sigma_{gsd} \cdot \sigma_{\alpha G}}\right]\right) \qquad \text{EQN. 8}$$

where $\overline{gsd}$ is the gsd mean, $\overline{\alpha_G}$ is the solar glint angle mean.

In some embodiments, the optional step of clamping (step 314) the aggregated/downsampled image ($I_{DS}$) is performed using a Lin-Log clamp in accordance with:

$$I_C(x, y) = \begin{cases} thr + \ln(|I_{DS}(x, y) - thr|) & I_{DS}(x, y) > thr \\ I_{DS}(x, y)) & \text{otherwise} \end{cases} \forall (x, y) \in I_{DS}$$

EQN. 9 where $thr = \text{mean}(I_{DS}) + \Psi \cdot \text{std}(I_{DS})$, $\Psi$ is a value associated with a particular sensor, and $I_C$ is the clamped image used in subsequent processing. In some embodiments, the threshold selected varies based on the frequency of solar glint return. For example, more glint equates to stronger clamping being used (i.e., for higher levels of glint, $\Psi$ decreases).

The method also includes generating (step 316) magnitude (M(x,y)) and orientation ($\theta$(x,y)) values for each pixel in the aggregated image. M(x,y) and $\theta$(x,y) are determined in accordance with:

$$M(x,y) = \sqrt{dx^2 + dy^2}$$

EQN. 10

$$\theta(x, y) = \tan^{-1}\left(\frac{dy}{dx}\right), \theta \in [0, 2\pi].$$

EQN. 11 where dx and dy are images generated from the clamped image (or aggregated/downsampled image in the absence of clamping). In one embodiment, dx is a Gabor image generated using a differential kernel in one direction and a Gaussian kernel in the perpendicular direction, and dy is a Gabor image generated by transposing the kernels. Scaling induced by the kernels is removed from the dx and dy images prior to calculating M(x,y) and $\theta$(x,y).

One skilled in the art will appreciate that alternative methods may be used to calculate dx and dy. For example, other image processing operators (e.g., Sobel, Roberts, or Canny operators) can be used in alternative embodiments. Generally, these methods calculate gradients of the image intensity at each pixel, providing the direction of the largest increases from light to dark and the rate of change in that direction. This shows how the image changes at that pixel and how likely that pixel is located at an edge in the image.

The method also includes providing (step 360) the magnitude and orientation values to a system for detecting objects in the aggregated image. The system may, for example, implement the method of FIG. 1 in which the magnitude and orientation values are provided to step 104 of FIG. 1 for further processing to identify the region in the image corresponding to a target object.

Figure 4:
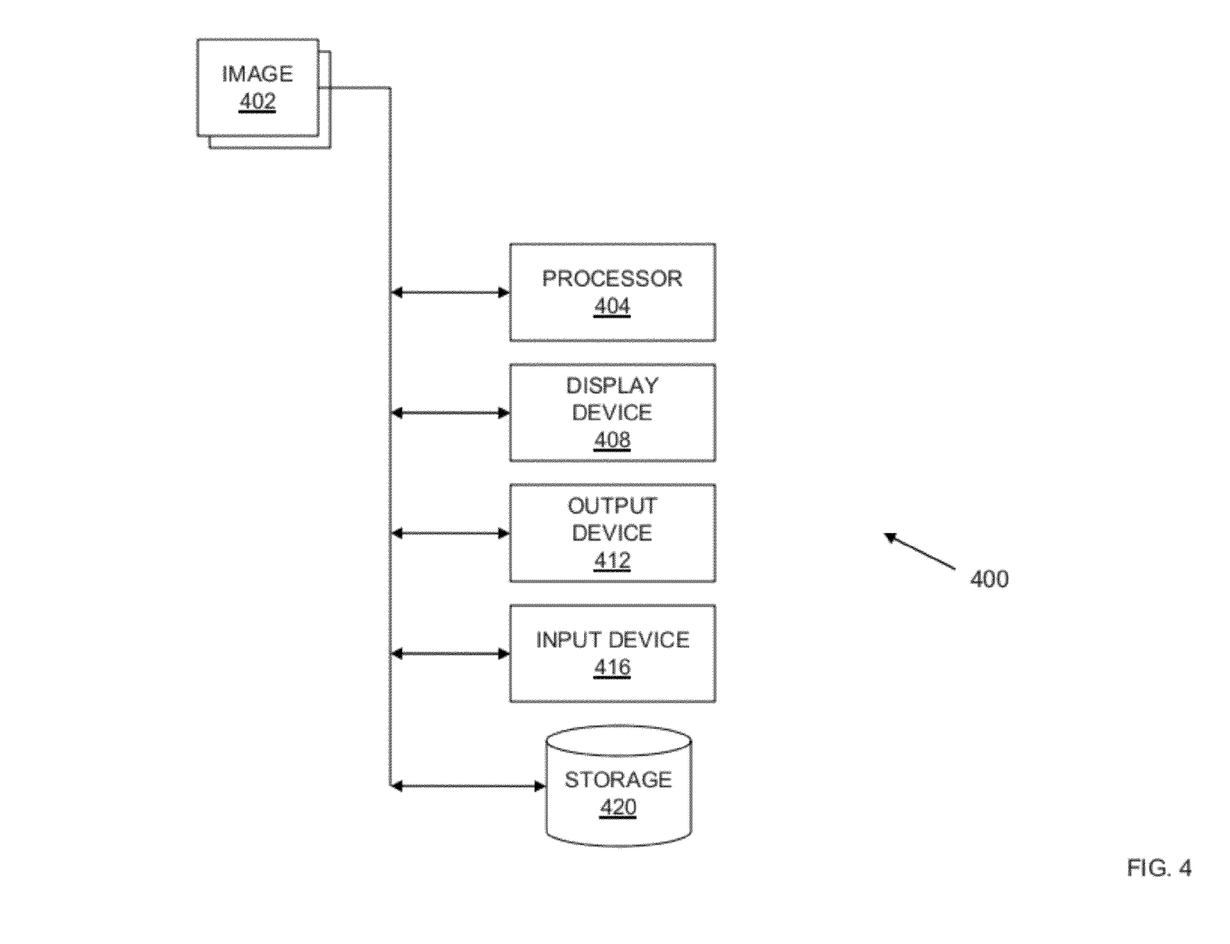
FIG. 4 is a schematic illustration of a system for detecting objects in an image, according to an embodiment.

FIG. 4 is a schematic illustration of a system 400 for detecting objects in an image 402, according to an embodiment. The system 400 includes a processor 404 for processing the image 402. The processor 404 stores a variety of information about the image 402 and the system 400. The storage device 420 can include a plurality of storage devices. The storage device 420 can include, for example, long-term storage (e.g., a hard drive, a tape storage device, flash memory), short-term storage (e.g., a random access memory, a graphics memory), and/or any other type of computer readable storage.

The modules and devices described herein can, for example, utilize the processor 404 to execute computer executable instructions and/or include a processor to execute computer executable instructions (e.g., an encryption processing unit, a field programmable gate array processing unit). It should be understood that the system 400 can include, for example, other modules, devices, and/or processors known in the art and/or varieties of the illustrated modules, devices, and/or processors.

The input device 416 receives information associated with the system 400 (e.g., instructions from a user, instructions from another computing device) from a user (not shown) and/or another computing system (not shown). The input device 416 can include, for example, a keyboard, scanner or mouse. The output device 412 outputs information associated with the system 400 (e.g., information to a printer (not shown), information to an audio speaker (not shown)).

The optional display device 408 displays information associated with the system 400 (e.g., status information, configuration information). The processor 404 executes the operating system and/or any other computer executable instructions for the system 400 (e.g., processes the image 402 to detect objects in the image 402).

Figure 5:
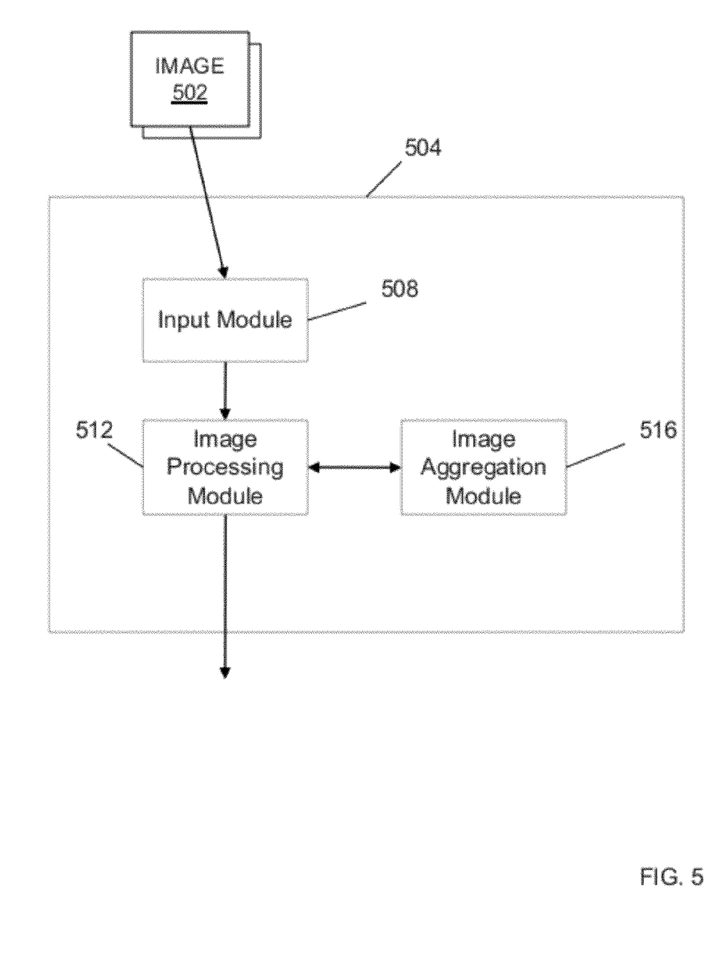
FIG. 5 is a schematic illustration of exemplary modules implemented in a processor, according to an embodiment.

FIG. 5 is a schematic illustration of exemplary modules implemented in a processor 504, according to an embodiment. In one embodiment, the processor 504 is used as the processor 404 of FIG. 4 to implement the methods of FIGS. 1 and 3. The processor 504 includes an input module 508, an image processing module 512, and an image aggregation module 516. The input module 508 receives magnitude and orientation values for each pixel in an image 502 and provides the values to the image processing module 512. The image processing module 512 performs, for example, steps 108, 112, 116, 120, 124, 128 and 132 of FIG. 1. The image aggregation module 516 performs, for example, steps 308 and 312 of FIG. 3.

Figure 6:
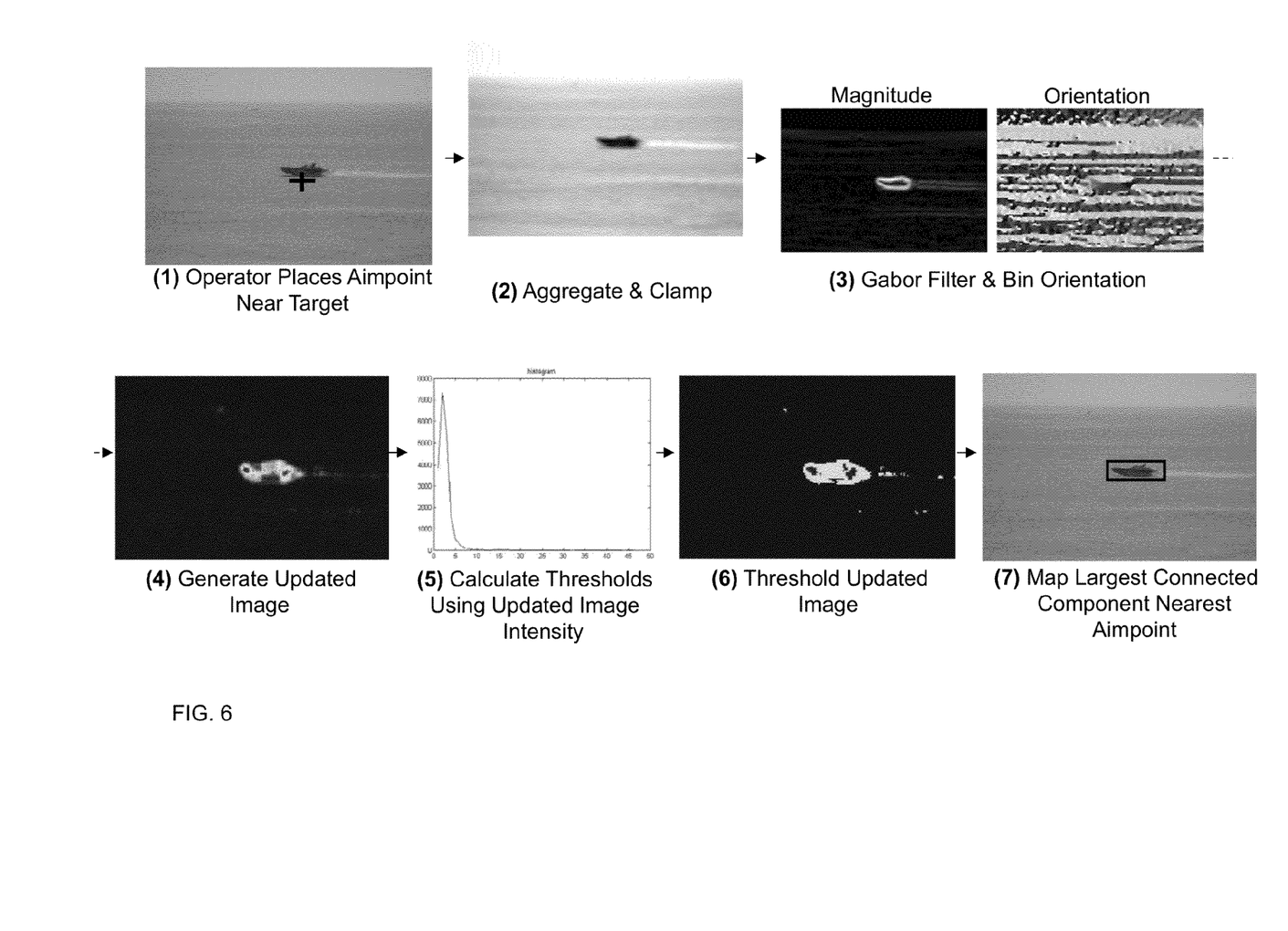
FIG. 6 is a graphical representation of experimental results generated in applying object detection methods to an example image.

FIG. 6 is a graphical representation of experimental results generated in applying object detection methods to an example image. Image 1 is an initial image received in, for example, step 304 of FIG. 3. An operator has placed an aimpoint near a target object (boat) in the image. Image 2 is a plot of a clamped image following the aggregating steps 308 and 312 and clamping step 314. Image 3 is a plot of the magnitude and orientation generated in accordance with step 316. Image 4 is a plot of the updated image generated in step 128 of FIG. 1 following the performance of steps 104, 108, 112, 116, 120, and 124 of FIG. 1. Image 5 is a plot of the intensity/magnitude values of the updated image used to define thresholds. Image 6 is a plot of the updated image based on two thresholds being selected based on the data of image 5. Image 7 is image 1 with a box surrounding the target (boat), where the box corresponds to the region nearest the aimpoint resulting from a connected-component analysis performed in step 132 of FIG. 1.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be an FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include (and can be operatively coupled to receive data from and/or transfer data to) one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry® device or Apple® iPad device.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method for detecting objects in an image, comprising:
   a) receiving magnitude and orientation values for each pixel of a plurality of pixels in an image;
   b) assigning each pixel to one of a predetermined number of orientation bins based on the orientation value of each pixel;
   for each pixel in the plurality of pixels:
   c) determining, for a subject pixel in the plurality of pixels, a maximum of all the pixel magnitude values for each orientation bin in a predetermined region surrounding the subject pixel;
   d) summing the maximum pixel magnitude values for each of the orientation bins in the predetermined region surrounding the subject pixel; and
   e) assigning the sum to the subject pixel.

2. The method of claim 1, comprising generating an updated image of the pixels based on the sum for each pixel.

3. The method of claim 2, wherein generating the updated image comprises establishing thresholds for the pixel sums.

4. The method of claim 3, comprising identifying a target region in the updated image nearest an operator aimpoint by performing a connected-components analysis of the updated image based on the thresholds.

5. The method of claim 1, comprising aggregating the image prior to step a) by a function of horizontal ground sample distance of the image.

6. The method of claim 5, wherein aggregating the image prior to step a) comprises increasing the aggregation of the image via a bivariate function of the ground sample distance of the image and solar glint angle of the image.

7. The method of claim 1, comprising aggregating the image prior to step a) by a function of horizontal ground sample distance and solar glint angle of the image.

8. The method of claim 1, wherein the predetermined number of orientation bins is N and angular range of each bin is $$\frac{360°}{N}.$$

9. A system for detecting objects in an image, comprising:
an input module to receive magnitude and orientation values for each pixel of a plurality of pixels in an image; and
an image processing module to:
  a) assign each pixel to one of a predetermined number of orientation bins based on the orientation value of each pixel;
  for each pixel in the plurality of pixels:
  b) determine, for a subject pixel in the plurality of pixels, a maximum of all the pixel magnitude values for each orientation bin in a predetermined region surrounding the subject pixel;
  c) sum the maximum pixel magnitude values for each of the orientation bins in the predetermined region surrounding the subject pixel; and
  d) the sum to the subject pixel.

10. The system of claim 9, comprising an image aggregation module to aggregate the image prior to step a) by a function of horizontal ground sample distance of the image, wherein the image aggregation module provides the aggregated image to the pixel processing module.

11. The system of claim 10, wherein the image aggregation module is configured to increase the aggregation of the image via a bivariate function of the ground sample distance of the image and solar glint angle of the image.

12. The system of claim 9, comprising an image aggregation module to aggregate the image prior to step a) by a function of horizontal ground sample distance and solar glint angle of the image, wherein the image aggregation module provides the aggregated image to the pixel processing module.

13. A system for detecting objects in an image, comprising:
a) means for receiving magnitude and orientation values for each pixel of a plurality of pixels in an image;
b) means for assigning each pixel to one of a predetermined number of orientation bins based on the orientation value of each pixel;
for each pixel in the plurality of pixels:
c) means for determining, for a subject pixel in the plurality of pixels, a maximum of all the pixel magnitude values for each orientation bin in a predetermined region surrounding the subject pixel;
d) means for summing the maximum pixel magnitude values for each of the orientation bins in the predetermined region surrounding the subject pixel; and
e) assigning the sum to the subject pixel.

14. A non-transitory computer readable medium including instructions being operable to cause a data processing apparatus to including instructions being operable to cause an image processing module to:
a) receive magnitude and orientation values for each pixel of a plurality of pixels in an image;
b) assign each pixel to one of a predetermined number of orientation bins based on the orientation value of each pixel;
for each pixel in the plurality of pixels:
c) determine, for a subject pixel in the plurality of pixels, a maximum of all the pixel magnitude values for each orientation bin in a predetermined region surrounding the subject pixel;
d) sum the maximum pixel magnitude values for each of the orientation bins in the predetermined region surrounding the subject pixel; and;
e) assign the sum to the subject pixel.

15. The non-transitory computer readable medium of claim 14, wherein the instructions are operable to cause an image aggregation module to aggregate the image prior to step a) by a function of horizontal ground sample distance of the image, wherein the image aggregation module provides the aggregated image to the pixel processing module.

16. The non-transitory computer readable medium of claim 15, wherein the instructions are operable to cause an image aggregation module to increase the aggregation of the image via a bivariate function of the ground sample distance of the image and solar glint angle of the image.

17. The non-transitory computer readable medium of claim 14, wherein the instructions are operable to cause an image aggregation module to aggregate the image prior to step a) by a function of horizontal ground sample distance and solar glint angle of the image, wherein the image aggregation module provides the aggregated image to the pixel processing module.

* * * * *